May 12, 1964

M. C. BENEDICT 3,132,482

INJECTOR HEAD FOR LIQUID ROCKET

Filed June 23, 1959

INVENTOR
MARCUS C. BENEDICT

BY
ATTORNEY

3,132,482
INJECTOR HEAD FOR LIQUID ROCKET
Marcus C. Benedict, Glastonbury, Conn., assignor to United Aircraft Corporation, East Hartford, Conn., a corporation of Delaware
Filed June 23, 1959, Ser. No. 822,378
3 Claims. (Cl. 60—39.46)

This invention relates to an injector for a rocket combustion chamber.

The use of a multiplicity of injector elements arranged in close contact to one another for the discharge of a plurality of propellants into the combustion chamber is shown and claimed in the co-pending application of Ledwith et al., Serial No. 822,377, filed June 23, 1959, now Patent No. 3,071,925, having the same assignee as the present application. The present invention features a modification of this type of device in which the injector elements are substantially smaller and function as an injector for a single propellant with adjacent injector elements supplying different propellants. Another feature of the invention is an arrangement by which the function of the injector elements may be retained without the injector element structure previously provided. Another feature is the discharge of multiple propellants through a plurality of discharge tubes without the need for an injector element as previously utilized.

One feature of the invention is the formation of the discharge ends of the propellant tubes such that they cover substantially the entire area of the injector head.

Other features and advantages will be apparent from the specification and claims and from the accompanying drawing which illustrates an embodiment of the invention.

Figure 1:
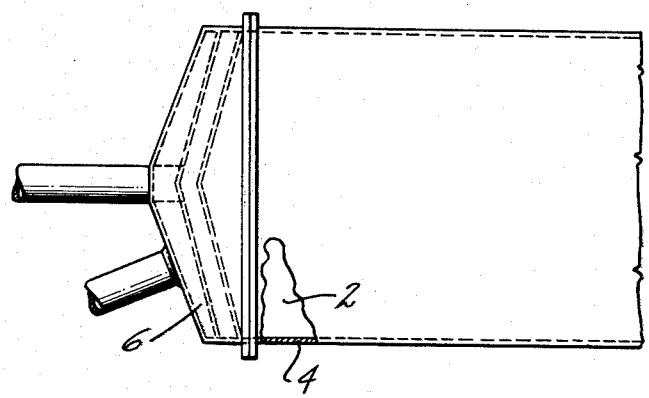
FIG. 1 is an elevation view of a rocket chamber with parts broken away.
Figure 2:
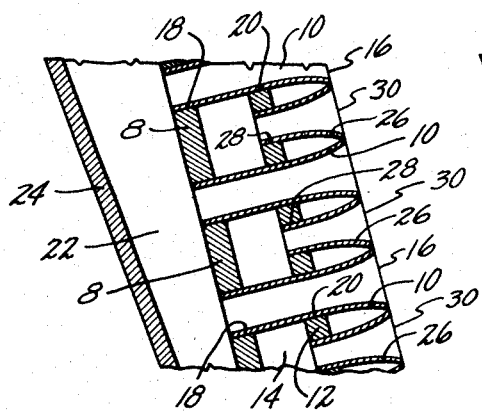
FIG. 2 is a fragmentary sectional view through the injector head.

The invention is shown in connection with a rocket combustion chamber 2 having a substantially cylindrical side wall 4 and a head 6 forming a closed end on the chamber. This head is constructed to form an injector head through which one or a plurality of propellants are discharged into the combustion chamber. The injector head includes a plate 8, the periphery of which is suitably attached to the side wall 4 which forms a basic structural element for the injector head. This plate 8 supports in spaced relation to each other a plurality of tubes 10 projecting from one side of the plate and through a second plate 12. The plates are spaced apart as shown and define a chamber 14 therebetween.

Figure 3:
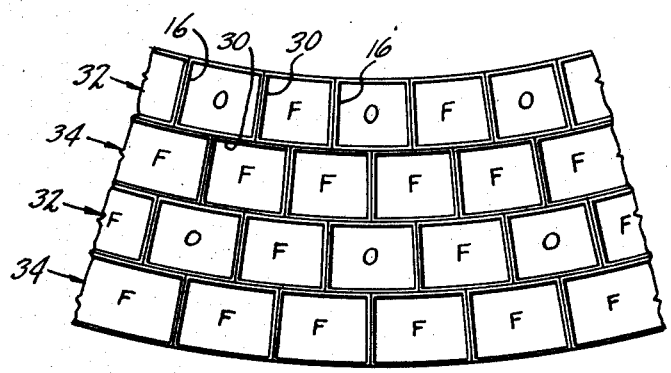
FIG. 3 is an elevation of the injector head of FIG. 2.

The free end of each tube 10 extends beyond the second plate 12 and is flared to a substantially sector shape 16, as shown in FIG. 3. Each tube 10 is suitably brazed in openings 18 and 20 in the plates 8 and 12, respectively. These tubes provide for a flow of propellant from a chamber 22 defined between a cap 24 and the plate 8.

In surrounding relation to each of the tubes 10 are a series of shorter tubes 26 fitting in openings 28 in the second plate 12 and having the free ends flared to a sector shape 30 comparable to the flared end of the tubes 10. These tubes 26 are brazed within the openings 28. The flared ends of the tubes 10 and 26 all terminate in substantially the same plane.

In the preferred arrangement, the tubes 10 are arranged in spaced concentric rings 32 about the longitudinal axis of the injector head and the tubes 10 are also in spaced relation to each other in the rings, as represented by the segment-shaped ends marked O in FIG. 3, representing one of the propellants, identified here as the oxidizer, which is delivered through the tubes 10. The other tubes 26 are identified as fuel tubes by the letter F are arranged in concentric rings 34 located between the concentric rings 32 of the tubes 10 and also positioned between adjacent tubes 10 in the same rings 32 as the tubes 10. Accordingly, the arrangement provides a series of concentric rings of discharge openings so constructed that each propellant (oxidant) opening O is completely surrounded by the other propellant (fuel) openings F defined by the tubes 26. With this arrangement, the entire surface of the injector head is covered by the discharge openings of the tubes 10 or 26.

Figure 4:
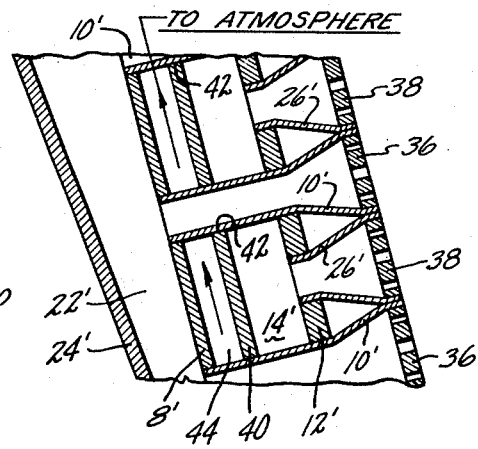
FIG. 4 is a view similar to FIG. 2 showing a modification.

If it is found that the flow through these flared openings is not adequate to discharge the propellants with adequate velocity for the required mixing of the propellants, the flared ends of the tubes 10' and 26', as shown in FIG. 4, may be provided with orifice plates 36 for the tubes 10' and 38 for the tubes 26'. In this way the size of the discharge openings may be controlled and thereby control the rate of discharge through these tubes as well as the extent of injection into the rocket chamber.

FIG. 4 shows a further modification in which there is positioned between the main plate 8' and the second plate 12' a spacer plate 40 with the tube 10' extending through openings 42 in the plate 40 and thence to plate 8. The tubes 10' are secured to the openings 42 in the plate 40. With this arrangement, by venting the space 44 between the plates 8' and 40 to the atmosphere any joint leakage for either propellant will be to the atmosphere or into the chamber 2 thereby minimizing the possibility of an explosive mixture of the propellants within a closed space.

It is to be understood that the invention is not limited to the specific embodiment herein illustrated and described, but may be used in other ways without departure from its spirit as defined by the following claims.

I claim:

1. An injector for a rocket combustion chamber, including spaced plates defining a chamber therebetween, a plurality of first tubes positioned in and extending from one of said plates through openings in the other of said plates and terminating substantially in a plane spaced from said other plate, and a plurality of second tubes secured in openings in said other plate and arranged in surrounding relation to said first tubes and communicating with said chamber, all of said tubes terminating substantially in the same plane, said second tubes being arranged in concentric rings spaced apart radially from one another and said first tubes being arranged in concentric rings between the concentric rings of said second tubes and the ends of said tubes remote from said plates being flared to substantially segment-shaped openings with the free edges of adjacent tubes secured together.

2. Apparatus according to claim 1 and having orifice plates extending across said flared tube ends.

3. Apparatus according to claim 1 wherein said second tubes are circumferentially spaced within first radially spaced concentric rings and with first tubes positioned circumferentially between and joined to said second tubes in said first concentric rings, and in which said first tubes are joined in second concentric rings positioned radially between said first concentric rings and with said first tubes of said second rings and said first and second tubes of said first concentric rings being joined.

References Cited in the file of this patent

UNITED STATES PATENTS

| | | |
|---|---|---|
| 1,132,539 | Cremieu-Javal | Mar. 16, 1915 |
| 2,405,785 | Goddard | Aug. 13, 1946 |
| 2,532,708 | Goddard | Dec. 5, 1950 |
| 2,733,570 | Macpherson | Feb. 7, 1956 |
| 2,928,236 | Kircher et al. | Mar. 15, 1960 |
| 2,929,208 | Schultz | Mar. 22, 1960 |
| 2,935,846 | Neale et al. | May 10, 1960 |
| 2,940,259 | Mantler | June 14, 1960 |
| 2,846,185 | Bayer | July 26, 1960 |
| 2,982,097 | Hull | May 2, 1961 |